United States Patent Office 3,597,472
Patented Aug. 3, 1971

3,597,472
INDANYL-N-METHYLCARBAMIC ACID ESTERS
Rudolf Heiss, Altenfurt, Nuremberg, Wolfgang Behrenz, Cologne-Stammheim, and Ingeborg Hammann, Cologne, Germany, assignors to Farbenfabriken Bayer Aktiengesellschaft, Leverkusen, Germany
No Drawing. Filed May 31, 1967, Ser. No. 642,301
Claims priority, application Germany, June 18, 1966,
F 49,503
Int. Cl. C07c *125/06*
U.S. Cl. 260—479        5 Claims

ABSTRACT OF THE DISCLOSURE 1-(mono and di-methyl)-7-(unsubstituted and methyl or chloro substituted)-indan-4-yl-N-methyl carbamic acid esters which possess pesticidal, especially acaricidal and insecticidal, properties and which may be produced by conventional methods.

---

The present invention relates to and has for its objects the provision for particular new indanyl-N-methyl carbamates which possess pesticidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, with other and further objects becoming apparent from a study of the within specification and accompanying examples.

It is already known that 2 - alkoxyphenyl - N - methyl-carbamic acid esters, in particular 2-isopropoxyphenyl-N-methyl-carbamic acid ester (A) [cf. German published specification 1,108,202], are insecticidally active. These known compounds have a relatively high stability in an alkaline environment as compared with other carbamic acid esters which are much more rapidly hydrolysed. These known insecticidal compounds can therefore be used on limed substrates; these is, however, the disadvantage that even in their case the effectiveness diminishes after only a short time.

It is furthermore known that other carbamic acid esters, in particular α-naphthyl-N-methylcarbamate (B) [cf. U.S. Pat. 2,903,478], may be used as insecticidally and acaricidally active compounds. This type carbamate has gained in practice a quite considerable importance.

It has been found in accordance with the present invention that the particular new indanyl-N-methyl carbamates having the formula

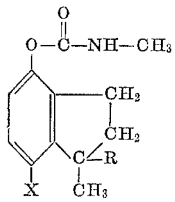

in which R is selected from the group consisting of hydrogen and methyl, and X is selected from the group consisting of hydrogen, methyl, and chlorine, exhibit strong pesticidal, especially insecticidal and acaricidal, properties.

It has been furthermore found in accordance with the present invention that a versatile process for the production of the particular new indanyl-N-methyl carbamates of Formula I above in favorable yields may be provided, which comprises
(a) reacting an indanole of the formula

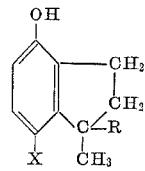

in which R and X are the same as defined above, with methyl isocyanate, or (b) reacting an indanole of Formula IIa in a first step with an excess of phosgene to form the corresponding chloroformic acid ester and reacting the latter, in a second step, with methylamine, or (c) reacting an indanole of Formula IIa in a first step with the equivalent amount of phosgene to form the corresponding bis(indanyl)-carbonate and reacting the latter, in a second step, with methylamine to split up the bis compound in the desired manner.

Surprisingly, the active compounds of the present invention show, compared with the carbamic acid esters known previously, a higher insecticidal and acaricidal effectiveness, a markedly longer lasting activity on alkaline substrates, for example freshly limed clay, and a more rapid insecticidal action.

The active compounds of the present invention therefore represent a considerable enrichment of the art.

In the following the individual methods of preparation noted above are discussed in more specific detail.

The reaction corresponding to (a) proceeds according to the following equation:

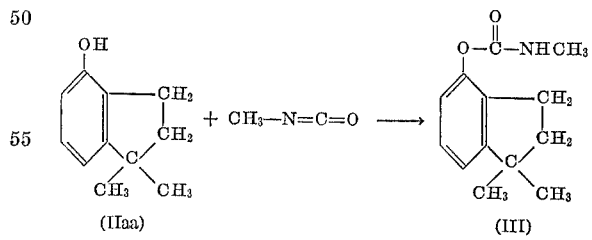

The reaction can be carried out in an inert solvent. For this purpose, there may be used, for example, hydrocarbons, such as benzine and benzene, or ethers, such as dioxan. It is, however, also possible to react the components directly in the absence of solvents. The reaction is accelerated by adding a tertiary amine, for example triethylamine. The reaction temperatures can be varied within a fairly wide range. In general, the reaction is carried out at substantially between about 0 to 150° C.

The second step of the reaction according to (b) can be illustrated by the following equation:

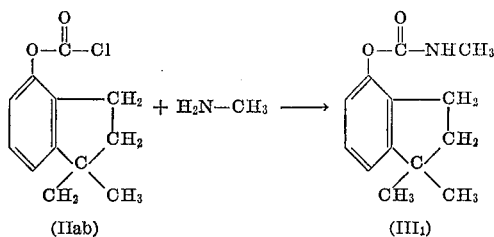

In the first step according to (b), the indanole is converted into the chloroformic acid ester with an excess of phosgene, expediently in the presence of inert solvents, such as aromatic hydrocarbons, particularly benzene, xylene and toluene. In order to bind the hydrochloric acid which is formed, a liquor (expediently alkali solution, such as sodium hydroxide solution) is constantly added dropwise. The pH-value should remain below 7. The reaction temperatures can be varied within a fairly wide range. In general, the work is carried out at substantially between about −10 to 10° C.

The second step of the reaction according to (c) proceeds according to the following equation:

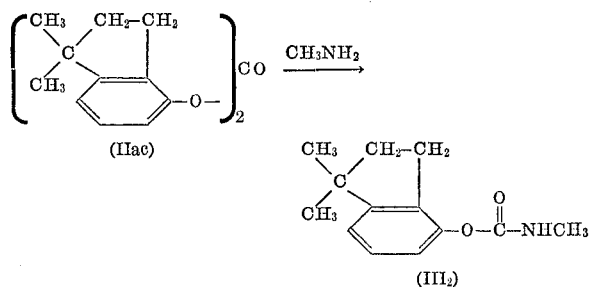

In the first step of reaction (c), the indanole is reacted with an equimolar amount of phosgene. Here it is expedient to work in the presence of inert solvents such as aromatic hydrocarbons, for example benzene and toluene. In order to bind the hydrochloric acid involved a base is added, expediently alkali metal hydroxide, for example sodium hydroxide. The pH is preferably about 8. The temperature, in this case also, may be varied within a fairly wide range; preferably, it may range substantially between about 20 to 60° C.

The bis-indanyl)-carbonate which is formed in the first step of reaction (c) is split up with methylamine. Here it is expedient to work without solvent. The most favorable reaction temperatures are from about −10 to 20° C.

Of the indanoles used as starting materials, in accordance with the present invention, 1,1-dimethyl-indanole-(4) is already known (cf. U.S. Pat. No. 3,057,929). 1,1-dimethyl-7-methyl-indanole-(4) and 1,1-dimethyl-7-chloro-indanole-(4) can be prepared in a similar manner.

The active compounds of the present invention exhibit strong insecticidal and acaricidal activities with low toxicity with respect to warm-blooded animals and also concomitantly low phytotoxicity. The actions set in rapidly and are long-lasting. The instant active compounds can therefore be used with good results for the control of noxious sucking and biting insects, Diptera as well as mites (Acarina).

To the sucking insects contemplated herein there belong, in the main, aphids, such as the peach aphid (*Myzus persicae*), the bean aphid (*Doralis fabae*); scales and mealybugs, such as *Aspidiotus hederae, Lecanium hesperium, Pseudococcus maritimus*; Thysanoptera, such as *Hercinothrips femoralis*; and bugs, such as the beet bug (*Piesma quadrata*) and the bed bug (*Cimex lectularius*); and the like.

With the biting insects contemplated herein there are classed, in the main, butterfly caterpillars, such as *Plutella maculipennis, Laymantria dispar*; beetles, such as granary weevils (*Sitophilus granarius*), the Colorado beetle (*Leptinotarsa decemlinmeata*), but also species which live in the soil, such as wireworms (Agriotes sp.) and the larvae of the cockchafer (*Melolontha melolontha*); cockroaches such as the German cockroach (*Blattella germanica*); Orthoptera, such as the house cricket (*Acheta domesticus*); termites, such as Reticulitermes; Hymenoptera, such as ants; and the like.

The Diptera contemplated herein comprise in particular the flies, such as the vinegar fly (*Drosophila melanogaster*), the Mediterranean fruit fly (*Ceratitis capitata*), the house fly (*Musca domestica*) and gnats, such as the mosquito (*Aedes aegypti*); and the like.

In the case of the mites contemplated herein, particularly important are the spider mites (Tetranychidae), such as the common spider mite (*Tetranychus urticae*), the European red mite (*Paratetranychus pilosus*); blister mites, such as the current blister mite (*Eriophyes ribis*) and tarsonemids, such as *Tarsonemus pallidus*; and ticks; and the like.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), amines (for instance, ethanolamine, etc.) amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001 and 20%, preferably 0.01 and 5%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.00001 and 95% by weight of the mixture.

In particular, the present invention contemplates methods of selectively controlling or combatting pests, e.g., anthropods, i.e., insects and acarids, and more particularly, methods of combatting at least one of insects and acarids which comprises applying to at least one of correspondingly (a) such insects, (b) such acarids, and (c) the corresponding habitat, a correspondingly combative amount, i.e., an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like, whereby to apply the active compounds either to the plant parts themselves or to the vicinal soil itself, or both.

The surprisingly favorable insecticidal and acaricidal activity of the particular new indanyl-N-methylcarbamates of the present invention is illustrated without limitation by the following examples.

EXAMPLE 1

Phaedon test

Solvent: 3 parts by weight acetone
Emulsifier: 1 part by weight alkyl aryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Horse-radish leaves (*Cochlearia armoratia*) are sprayed with the preparation of the given active compound until dripping wet and then infested with mustard beetles (*Phaedon cochleariae*).

After the specified period of time, the degree of destruction is determined as a percentage: 100% means that all the beetles are killed; 0% means that none of the beetles are killed.

The particular active compounds, the concentrations of such active compounds, the evaluation time and the results can be seen from the following Table 1:

TABLE 1.—PLANT-DAMAGING INSECTS

| Active compound | | Concentration of active compound in percent | Degree of destruction in percent after 3 days |
|---|---|---|---|
| (B) | 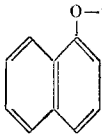 (known) | 0.1<br>0.02 | 100<br>90 |
| (III₃) |  | 0.1<br>0.02<br>0.004<br>0.0008 | 100<br>100<br>100<br>70 |

EXAMPLE 2

Pieris test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dew moist and then infested with caterpillars of the large white butterfly (*Pieris brassicae*).

After the specified period of time, the degree of destruction is determined as a percentage: 100% means that all the caterpillars are killed, whereas 0% means that none of the caterpillars are killed.

The particular active compounds, the concentrations of such active compounds, the evaluation time and the results can be seen from the following Table 2:

TABLE 2.—PLANT-DAMAGING INSECTS

| Active compound | | Concentration of active compound in percent | Degree of destruction in percent after 3 days |
|---|---|---|---|
| (B₁) | 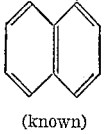 (known) | 0.1<br>0.02<br>0.004 | 100<br>100<br>55 |
| (III₄) |  | 0.1<br>0.02<br>0.004<br>0.0008<br>0.00016 | 100<br>100<br>100<br>100<br>90 |

EXAMPLE 3

Tetranychus test (ovicidal action)

Solvent: 3 parts by weight acetone
Emulsifier: 1 part by weight alkyl aryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Dwarf beans (*Phaseolus vulgaris*) which have been infested with about 100 eggs of the spider mite (*Tetranychus telarius*) are sprayed with the preparation of the given active compound until dripping wet.

After the specified period of time, it is ascertained whether any spider mites have hatched. The degree of destruction is determined as a percentage: 100% means that no spider mites have hatched; 0% means that completely normal hatching has occurred.

The active compounds, the concentrations of such active compounds, the evaluation time and the results can be seen from the following Table 3:

After the specified period of time, the degree of destruction is determined as a percentage: 100% means that all the grape mealybugs are killed; 0% means that none of the grape mealybugs are killed.

The active compounds, the concentrations of such active compounds, the evaluation time and the results can be seen from the following Table 4:

TABLE 4.—PLANT-DAMAGING INSECTS

| Active compound | | Concentration of active compound in percent | Degree of destruction in percent after 10 days |
|---|---|---|---|
| ($B_3$) | 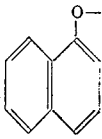<br>(known) | 0.1 | 30 |
| ($III_6$) | 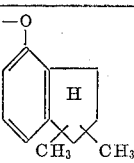 | 0.1<br>0.02 | 100<br>50 |

EXAMPLE 5

$LT_{100}$ test for Diptera

Test insect: *Aedes aegypti*
Solvent: Acetone 2 parts by weight of the particular active compound are dissolved in 1000 parts by volume of solvent. The

TABLE 3.—PLANT-DAMAGING MITES

| Active compound | | Concentration of active compound in percent | Degree of destruction in percent after 48 hours |
|---|---|---|---|
| ($B_2$) | 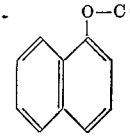<br>(known) | 0.2 | 0 |
| ($III_9$) | 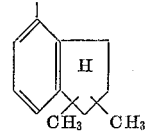 | 0.2 | 80 |

EXAMPLE 4

Pseudococcus test

Solvent: 3 parts by weight acetone
Emulsifier: 1 part by weight alkyl aryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Potato tubers which are heavily infested with the grape mealybug (*Pseudococcus maritimus*) are sprayed with the preparation of the given active compound until dripping wet.

solution so obtained is diluted with further solvent to the desired lower final concentration.

2.5 ml. of the solution of the given active compound are pipetted into a Petri dish. On the bottom of the Petri dish there is placed a filter paper with a diameter of about 9.5 cm. The Petri dish remains uncovered until the solvent has completely evaporated. The amount of active compound per square metre of filter paper varies with the concentration of the solution of active compound used. About 25 test insects are then placed in the Petri dish and it is covered with a glass lid.

The condition of the test insects is continuously observed. The time which is necessary for a 100% knock down effect is determined.

The test insects, the active compounds, the concentrations of such active compounds and the periods of time at which there is a 100% knock down effect can be seen from the following Table 5:

TABLE 5.—LT$_{100}$ TEST FOR DIPTERS

| Active compound | | Test insect | Concentration of active compound in percent solution | LT$_{100}$, minutes |
|---|---|---|---|---|
| (B$_4$) | 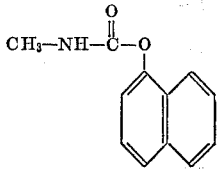 (known) | Aedes aegypti | 0.2<br>0.04<br>0.008 | 180<br>180<br>(¹) |
| (III$_7$) | 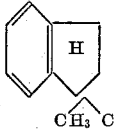 | Aedes aegypti | 0.2<br>0.04<br>0.008<br>0.0016 | 60<br>60<br>60<br>(²) |
| (IV) | 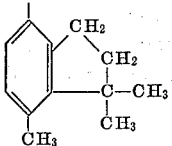 | Aedes aegypti | 0.2<br>0.04<br>0.008<br>0.0016 | 90<br>120<br>120<br>180 |
| (V) | 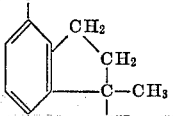 | Aedes aegypti | 0.2<br>0.04<br>0.008 | 90<br>90<br>180 |

¹ 3 hours (20%).
² 3 hours (80%).

EXAMPLE 6

LD$_{100}$ test

Test insects: *Rhodnius prolixus, Sitophilus granarius, Blattella germanica*
Solvent: Acetone 2 parts by weight of the particular active compound are dissolved in 1000 parts by volume of the solvent. The solution so obtained is diluted with further solvent to the desired final concentration.

2.5 ml. of the solution of such active compound are pipetted into a Petri dish. On the bottom of the Petri dish there is placed a filter paper with a diameter of about 9.5 cm. The Petri dish remains uncovered until the solvent has completely evaporated. The amount of active compound per square metre of filter paper varies with the concentration of the solution of active compound used. About 25 test insects are then placed in the Petri dish and it is covered with a glass lid.

The condition of the test insects is observed after 1 and 3 days from the commencement of the experiments. The knock down effect is determined as a percentage.

The active compounds, the concentrations of such active compounds, the test insects and the results can be seen from the following Table 6:

TABLE 6.—LD₁₀₀ TEST

| Active compound | Test insects | Concentration of active compound in percent solution | Knockdown effect in percent |
|---|---|---|---|
| (B₅) CH₃—NH—C(=O)—O—[naphthalenyl] (known) | Rhodnius prolixus | 0.2 / 0.04 / 0.008 | 100 / 100 / 0 |
|  | Sitophilus granarius | 0.2 / 0.04 | 80 / 0 |
|  | Blattella germanica | 0.2 / 0.04 | 80 / 40 |
| (III₈) CO₃—NH—C(=O)—O—[5,5-dimethyl-5,6-dihydronaphthalenyl] | Rhodinius prolixus | 0.2 / 0.04 / 0.008 | 100 / 100 / 80 |
|  | Sitophilus granarius | 0.2 / 0.04 / 0.008 | 100 / 90 / 30 |
|  | Blattella germanica | 0.2 / 0.04 / 0.008 | 100 / 100 / 20 |

EXAMPLE 7
Residual test

Test insects: *Aedes aegypti*
Wettable powder base consisting of:
- 3% sodium diisobutylnaphthalene-1-sulphonate
- 6% sulphite waste liquor, partially condensed with aniline
- 40% highly dispersed silicic acid (containing calcium oxide)
- 51% colloidal kaolin To produce a suitable preparation of the partciular active compound, 1 part by weight of such active compound is intimately mixed with 9 parts by weight of the wettable powder base. The spray powder thus obtained is suspended in 90 parts of water.

The suspension of the given active compound is sprayed, in an amount of 1 g. of active compound per square metre, onto substrates consisting of different materials.

The sprayed coatings are, at specific intervals of time, tested for their biological activity.

For this purpose, the test insects are placed on the treated substrates. There is put over the test insects a squat cylinder which is closed at its upper end with a wire mesh in order to prevent the insects from escaping. After the insects have spent 8 hours on the substrate, the knock down effect is determined as a percentage.

The active compounds, the nature of the substrates, and the results, can be seen from the following Tables 7a and 7b:

TABLE 7a.—RESIDUAL TEST

| Active compound | Test substrate | Test insects | Age of the residuals coverings in week — Knockdown effect on the test insects in percent | | |
|---|---|---|---|---|---|
| | | | 1 | 2 | 4 |
| (B₆) CH₃—HN—C(=O)—O—[naphthalenyl] (known) | Freshly limed clay | Aedes aegypti | 90 | 0 | |
| (A) CH₃—NH—C(=O)—O—[phenyl-OCH(CH₃)₂] (known) | Freshly limed clay | Aedes aegypti | 100 | 0 | |
| (III₉) CH₃—NH—C(=O)—O—[5,5-dimethyl-5,6-dihydronaphthalenyl] | Freshly limed clay | Aedes aegypti | 100 | 100 | 100 |

TABLE 7b.—RESIDUAL TEST

| Active compound | Test substrate | Test insect | Age of the residual coverings in weeks | | |
|---|---|---|---|---|---|
| | | | 1 | 2 | 4 |
| | | | Knockdown effect on the test insects in percent after minutes (') | | |
| (B$_7$) CH$_3$—NH—C(=O)—O—[naphthyl] (known) | Clay<br>Wood | Aedes aegypti<br>Aedes aegypti | 100 (150')<br>100 (180') | 100 (210')<br>100 (180') | 100 (210')<br>100 (480') |
| (III$_{10}$) CH$_3$—NH—C(=O)—O—[indanyl with H, CH$_3$, CH$_3$] | Clay<br>Wood | Aedes aegypti<br>Aedes aegypti | 100 (15')<br>100 (15') | 100 (30')<br>100 (30') | 100 (30')<br>100 (45') |

EXAMPLE 8

Phaedon larvae test

Solvent: 3 parts by weight acetone
Emulsifier: 1 part by weight alkyl aryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetles are killed; 0% means that none of the beetles are killed.

The active compounds, the concentrations of such active compounds, the evaluation time and the results can be seen from the following Table 8:

TABLE 8.—PLANT-DAMAGING INSECTS

| Active compound | Concentration of active compound in percent | Degree of destruction in percent after 3 days |
|---|---|---|
| (C) CH$_3$—C(=N—N(CH(CH$_3$)$_2$))—C(=O)—O—C—N(CH$_3$)$_2$ (known) | 0.1<br>0.02 | 95<br>0 |
| (III$_{11}$) O—C(=O)—NH—CH$_3$ on indanyl (H, CH$_3$, CH$_3$) | 0.1<br>0.02<br>0.004<br>0.0008<br>0.00016 | 100<br>100<br>100<br>100<br>40 |
| (IV$_1$) O—C(=O)—NH—CH$_3$ on indanyl (H, CH$_3$, CH$_3$, CH$_3$) | 0.1<br>0.02<br>0.004<br>0.008 | 100<br>100<br>98<br>30 |
| (V$_1$) O—C(=O)—NH—CH$_3$ on indanyl (H, CH$_3$, CH$_3$, Cl) | 0.1<br>0.02 | 100<br>100 |

The process for producing the particular new compounds of the present invention is illustrated, without limitation, by the following further examples.

EXAMPLE 9

(III₁₂)

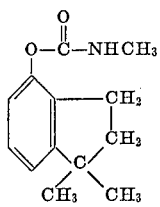

16.2 g. (0.1 mole) 1,1-dimethyl-indanole-(4) are dissolved in 100 ml. anhydrous benzene, and 6.3 g. (0.11 mole) methylisocyanate and 3 drops triethylamine are added. The reaction mixture is heated to 50° C. for one hour and left to stand overnight. After evaporation of the solvent in a vacuum, the reaction product is obtained as a solid, white residue. Recrystallised from alcohol/benzene, the product, 1,1-dimethylindan-4-yl-N-methyl carbamate, melts at 128° C.

EXAMPLE 10

(IV₂)

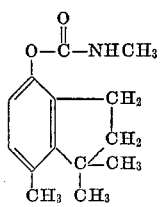

According to the same method as used in Example 9, reacting 1,1,7-trimethyl-indanole-(4) with methylisocyanate, 1,1,7 - trimethyl-indan-4-yl-N-methyl-carbamate is obtained. Melting point 131–132° C.

EXAMPLE 11

(V₂)

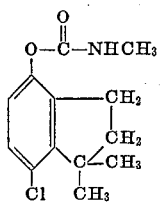

When 1,1-dimethyl - 7 - chloro - indanole-(4) is reacted with methylisocyanate under the same conditions as in Example 9, 1,1-dimethyl-7-chloro-indan-4-yl - N - methyl-carbamate with a melting point of 115–116° C. is obtained. In addition, small amounts of an isomeric compound of unknown constitution (melting point 65–66° C.) are also formed.

EXAMPLE 12

A benzene solution of 22.4 g. 1,1-dimethyl-indanole-(4) and 20 g. triethylamine are simultaneously added dropwise, at a temperature of 5–10° C. and with stirring, to a solution of 30 g. phosgene in 300 ml. benzene. The indanole should always be present in small excess. After the dropwise addition has been completed, stirring is effected for a further 10 minutes and the excess phosgene is then drawn off in a vacuum. The precipitated salt is filtered off and 12.4 g. methylamine are introduced into the filtrate at 5–10° C., with stirring. After the methyl-ammonium chloride has been filtered off, the solvent is drawn off, 1,1 - dimethyl-indanyl-(4)-N-methylcarbamate being obtained in pure form.

EXAMPLE 13

55 g. phosgene are introduced into a mixture of 162 g. 1,1-di-methyl-indanole-(4), 175 ml. water and 100 ml. benzene. The reaction solution is kept alkaline by simultaneous dropwise addition of 98 g. of a 45% solution of sodium hydroxide. During the reaction, the temperature increases to about 40° C. After the reaction has ended, a further small amount of phosgene is introduced, so that the solution reacts slightly acidically. The benzene layer is separated from the aqueous layer, diluted with 150 ml. benzene, and 107 ml. of a 29.2% solution of methylamine are added dropwise at 5–10° C. Stirring is continued for a further 4 hours, followed by extraction with 500 ml. 2 N NaOH and washing of the benzene layer several times with water. After the benzene has been drawn off, the carbamate, i.e., 1,1-dimethylindan-4-yl-N-methylcarbamate, is obtained in pure form.

EXAMPLE 14

Using corresponding molar amounts of each of the following indan-4-ols with methyl isocyanate in accordance with the procedure of Example 9:

(a) 1-methyl-indan-4-ol;
(b) 1,7-dimethyl-indan-4-ol; and
(c) 1-methyl-7-chloro-indan-4-ol;

the corresponding indan-4-yl-N-methyl carbamates are produced:

(a′) 1-methyl-indan-4-yl-N-methyl carbamate;
(b′) 1,7-dimethyl-indan-4-yl-N-methyl carbamate; and
(c′) 1-methyl-7-chloro-indan-4-yl-N-methyl carbamate.

Preparation of 1,1,7-trimethyl-4-hydroxy-indane 50 g. of 2,2,6-trimethyl-chromane are dropped into a suspension of 42 g. of $AlCl_3$ in 100 ml. chlorobenzene which is heated to 50° C. After the addition of the chromane, the mixture is stirred and kept at a temperature of 50° C. for 1½ hours. After cooling the mixture by adding ice, 250 ml. of 10% hydrochloric acid are added. The aqueous phase is separated from the organic phase. The phenol is extracted by means of a 10% aqueous solution of caustic soda. The alkaline extract is acidified and extracted by means of methylene chloride. The organic phase is evaporated. There remain 33.2 g of 1,1,7-trimethyl-4-hydroxy-indane in the form of an oil which soon solidifies. After recrystallization from benzine, the phenol has a melting point of 79–80° C.

Preparation of 1,1-dimethyl-4-hydroxy-7-chloro-indane 330 g. of $AlCl_3$ are suspended in 1250 ml. chlorobenzene. The suspension is heated to 100° C. 500 g. of 2,2-dimethyl - 6 - chloro - chromane, dissolved in 300 ml. chlorobenzene, are added dropwise. The resulting mixture is stirred for 2 hours at the same temperature. The mixture is cooled externally with ice and 100 ml. of 20% hydrochloric acid are added after cooling. The organic phase is extracted by means of a 15% aqueous caustic soda solution and separated. The separated aqueous phase is acidified and then extracted by means of methylene chloride. The organic phase is washed with water until there is a neutral reaction, then dried and evaporated. 452 g. of the above-mentioned phenol are obtained, which has a melting point of 73–76° C. after recrystallization from benzine.

It will be realized by the artisan that all of the foregoing compounds contemplated by the present invention possess the desired selective pesticidal, especially arthropodicidal, i.e., insecticidal or acaricidal, properties for combatting insects and acarids, and that such compounds have not only a very slight toxicity toward warm-blooded creatures, but also a concomitantly low phytotoxicity. Such compounds are markedly resistant to limed substrates and are therefore of especial importance in providing stable highly active arthropodicides in alkaline environments with long lasting effectiveness.

It will be appreciated that as may be used herein, i.e., both in the specification and claims, the terms "arthropod," "arthropodicidal" and "arthropodicide" are defined as including specifically both insects and acarids within the contemplation of their meaning, for convenience in determining the collective aspects of utility herein. Thus, the

What is claimed is:

1. Indanyl-N-methyl carbamate having the formula

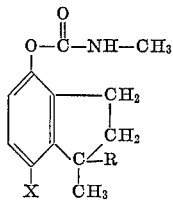

in which R is selected from the group consisting of hydrogen and methyl, and X is selected from the group consisting of hydrogen, methyl, and chloro.

2. Carbamate according to claim 1 wherein R is methyl, and X is selected from the group consisting of hydrogen, methyl, and chloro.

3. Carbamate according to claim 1 wherein such compound is -,1-dimethyl-indan-4-yl-N-methyl carbamate having the formula

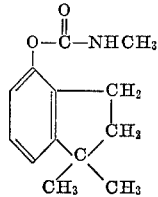

4. Carbamate according to claim 1 wherein such compound is 1,1,7-trimethyl-indan-4-yl-N-methyl carbamate having the formula

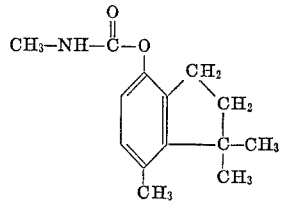

5. Carbamate according to claim 1 wherein such compound is 1,1-dimethyl-7-chloro-indan-4-yl-N-methyl carbamate having the formula

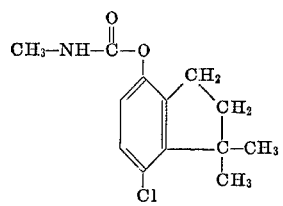

References Cited

UNITED STATES PATENTS 2,870,057    1/1959    Hartle et al. _____ 260—479

JAMES A. PATTEN, Primary Examiner

U.S. Cl. X.R.

260—463, 623; 424—300

PO-1050
(5/69)

UNITED STATES PATENT OFFICE
CERTIFICATE OF CORRECTION

Patent No. 3,597,472          Dated August 3, 1971

Inventor(s) Rudolf Heiss, Wolfgang Behrenz and Ingeborg Hammann

It is certified that error appears in the above-identified patent and that said Letters Patent are hereby corrected as shown below:

Col.1, line 41 - "these" should be --there--.

Col. 2, lines 1 and 2 - "hydroden" should be --hydrogen--.

Col. 3, line 21 - First formula of (IIab), "$CH_2$" should be --$CH_3$--.

Col. 5, line 4 - after "instant" insert --invention--.

Col. 15, line 56 - "22.4 g" should be --32.4 g--.

Col. 17, line 34 - "-,1" should be --1,1- --.

Signed and sealed this 8th day of February 1972.

(SEAL)
Attest:

EDWARD M. FLETCHER, JR.
Attesting Officer

ROBERT GOTTSCHALK
Commissioner of Patents